United States Patent [19]
Barlow et al.

[11] Patent Number: 5,168,564
[45] Date of Patent: Dec. 1, 1992

[54] CANCEL MECHANISM FOR RESILIENT RESOURCE MANAGEMENT AND CONTROL

[75] Inventors: George J. Barlow, Tewksbury; Donald L. Smith, Bedford, both of Mass.

[73] Assignee: Bull HN Information Systems Inc., Billerica, Mass.

[21] Appl. No.: 593,916

[22] Filed: Oct. 5, 1990

[51] Int. Cl.$^5$ .............................................. G06F 13/14
[52] U.S. Cl. ...................................... 395/575; 371/12
[58] Field of Search ................. 395/575, 325, 725; 371/12; 364/270.5, 240, 260.2, 935.4, 950.1, 944.1, 941.8

[56] References Cited

U.S. PATENT DOCUMENTS 4,587,609 5/1986 Boudeau et al. .................. 395/725
4,912,707 3/1990 Kogge et al. ....................... 371/12

Primary Examiner—Vincent P. Canney
Attorney, Agent, or Firm—Faith F. Driscoll; John S. Solakian

[57] ABSTRACT

A multiprocessor system includes a plurality of identical central subsystem (CSS) units, a plurality of memory and input/output (I/O) subsystem units which connect in common to an asynchronous bus system. Each CSS subsystem unit includes a cancel command mechanism for enabling each such unit to effectively withdraw from the asynchronous bus or switch the state of a resource such as a memory or I/O lock mechanism included in such subsystem without otherwise disturbing the state of such subsystems.

11 Claims, 5 Drawing Sheets

CANCEL MECHANISM FOR RESILIENT RESOURCE MANAGEMENT AND CONTROL

RELATED PATENT APPLICATIONS

1. The patent application of George J. Barlow and Donald L. Smith entitled, "A Minimum Contention Processor and System Bus System," filed on Oct. 5, 1990, bearing serial number 07/593,437, which is assigned to the same assignee as this patent application.

2. The patent application of George J. Barlow and Donald L. Smith entitled, "High Performance Round Robin Distributed Bus Priority Network," filed on Oct. 5, 1990, bearing serial number 07/593,407, which is assigned to the same assignee as this patent application.

3. The patent application of George J. Barlow and Donald L. Smith entitled, "Flexible Distributed Bus Priority Network," filed on Oct. 5, 1990, bearing Ser. No. 07/593,436, which is assigned to the same assignee as this patent application.

4. The patent application of George J. Barlow, James W. Keeley, Richard A. Lemay, Jian-Kuo Shen, Robert V. Ledoux, Thomas F. Joyce, Richard P. Kelly and Robert C. Miller entitled, "Recovery Method and Apparatus for a Pipelined Processing Unit of a Multiprocessor System," filed on Oct. 5, 1990 bearing Ser. No. 07/593,458, which is assigned to the same assignee as this patent application.

BACKGROUND OF THE INVENTION

1. Field of Use

The present invention relates to data processing systems and more particularly to multiprocessing systems which perform locking operations, such as read-modify-write operations.

2. Prior Art

In multiprocessor systems, processing units are required to share the use of memory resources. A locking mechanism is normally used in conjunction with such resources to ensure that the resource is accessed by only one processing unit at a time.

Most access difficulties are encountered when a processing unit is required to perform an instruction sequence specifying a read-modify-write (RMW) operation. In an RMW operation, one processing unit fetches data from a location in memory, performs an operation on the data contents of the location and writes the modified data back into the original memory location.

One way to prevent more than one processing unit from performing a RMW operation on the same memory location, an interlock read instruction is utilized. This involves the use of a lock indicator device, which is set during the read portion of an RMW operation to prevent access to a specific memory location, and is reset after the write portion of the RMW operation is completed. If a second processing unit should attempt to access the same memory location to perform an RMW operation, the memory subsystem will send a busy signal indicating that the memory location is in use.

From the above, it can be seen that unpredictable results affecting data integrity can occur if a lock mechanism fails to operate properly. Accordingly, the lock mechanism becomes very important to the operation of a multiprocessor system, in the event that anything should go wrong with such lock mechanism. Therefore, a need exists to be able to alter the state of such mechanism for enabling system recovery once having detected that the lock mechanism is operating improperly.

Additionally, it becomes desirable in certain situations to change the state of other kinds of resources included within a subsystem unit without disturbing the unit's overall state. In many systems, these units connect in common to an asynchronously operated system bus. It has been found that once a bus cycle of operation is started, it is not possible to withdraw from the bus cycle until the operation is completed. Accordingly, when it becomes desirable to change the state of a resource, such as a lock mechanism, the commands issued to accomplish this type of operation still resulted in having the memory involved in the operation perform a cycle of operation and inhibit the transfer of the memory data accessed. This can prove undesirable, particularly in the case of recovery operations.

Accordingly, it is a primary object of the present invention to provide for reliable recovery operations within a multiprocessor system.

It is a more specific object of the present invention for recovery of multiprocessor system operation in the event of a resource failure.

SUMMARY OF THE INVENTION

The above and other objects of the present invention are achieved in a preferred embodiment of a multiprocessor system which incorporates the principles of the present invention. The multiprocessor system includes a number of identical central subsystem (CSS) units and a plurality of memory subsystem units which connect in common to an asynchronously operated system bus. Each CSS unit includes apparatus for detecting when a lock operation is not being carried out properly involving any one of the plurality of memory subsystems. Also, each CSS unit further includes storage means for enabling the identification of the particular lock address involved in the operation so as to enable the system to recover from a transient or intermittent fault condition.

In accordance with the present invention, a cancel mechanism is included within said multiprocessor system which enables a subsystem unit to generate a cancel command for accompanying a command specifying an operation to be performed. This is done when the state of a particular resource included within a subsystem memory, such as a lock mechanism, is to be altered without disturbing other parts of the memory subsystem by requiring to perform the specified operation. The cancel command is issued over an asynchronous system bus which includes a distributed tie-breaking priority network for allowing a unit exclusive access to the system bus for a bus cycle of operation. This type of system bus is disclosed in U.S. Pat. No. 4,901,226.

In accordance With the invention, the cancel command can be issued anytime prior to the start of the data cycle portion of a bus cycle which corresponds to the time interval during which the unit which was granted bus access (master) transfers request address data and command information to another unit (slave). This enables a system to be able to eliminate the execution of a particular command upon discovering that the command is invalid (e.g. wrong address, operation, etc.), thereby preventing the system from being placed in an undeterminate state.

The receiving unit (slave), in response to the command and accompanying cancel command, operates to perform any indicated state change in a particular resource (e.g. set or reset lock mechanism) without further cycling (e.g. read or write cycle). In those cases where the command does not specify a resource change, such as a read or write command, the cancel command will prevent the receiving unit from executing the specified operation.

Thus, the above cancel mechanism provides additional flexibility in how units which operate in conjunction with an asynchronous system bus issues commands for controlling and managing system resources.

The above arrangement provides a resilient mechanism for controlling system resource states useful for resource management and for system recovery in the event of transient fault conditions causing the system to be placed in an indeterminate state.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

DETAILED DESCRIPTION OF THE PREFERRED EMBODIMENT

Overall System

Figure 1:
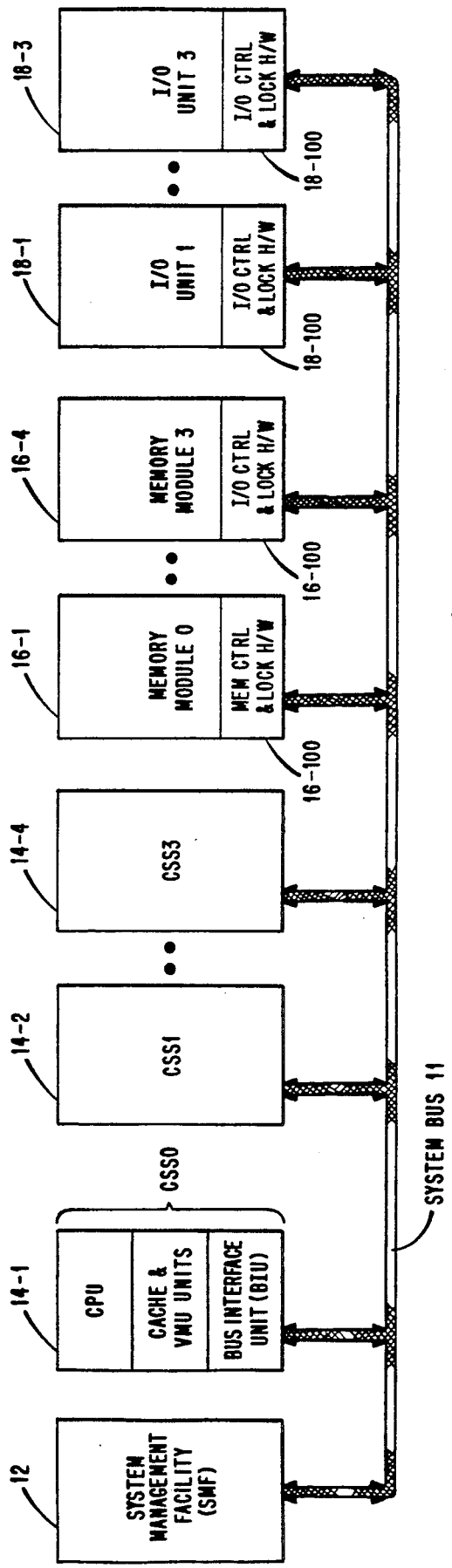
FIG. 1 is a block diagram of a multiprocessor system which incorporates the principles of the present invention.

FIG. 1 shows in block diagram form, a multiprocessor system 10 which incorporates the method and apparatus of the present invention. As shown, system 10 includes a system management facility (SMF) 12, a plurality of identical central subsystem (CSS) units 14-1 through 14-4, and a number of different subsystems 16 through 18 which are tightly coupled together by a system bus 11. The illustrative different subsystems include a number of memory subsystems 16-1 through 16-4 and a number of input/output subsystems 18-1 through 18-3. Additionally, the CSS units 14-1 through 14-4 and memory subsystems 16-1 through 16-4 connect in common to a unidirectional asynchronous processor (P) bus 19. Each subsystem includes an interface unit (BIU) which enables the subsystem to transmit or receive requests in the form of commands, interrupts, data or responses/status to another subsystem on the system bus 11 in an asynchronous manner.

At the left end of bus 11, a termination network not shown defines the high priority end of bus 11. The SMF unit 12 which is positioned to the right of the termination network has the highest priority. Bus priority decreases as a function of each subsystem's distance from the termination network. The different subsystems communicate requests over system bus 11 on a priority basis defined by a distributed priority network included within system bus 11. For more detailed information regarding this arrangement, reference may be made to U.S. Pat. No. 4,724,519.

CSS Unit

Figure 2:
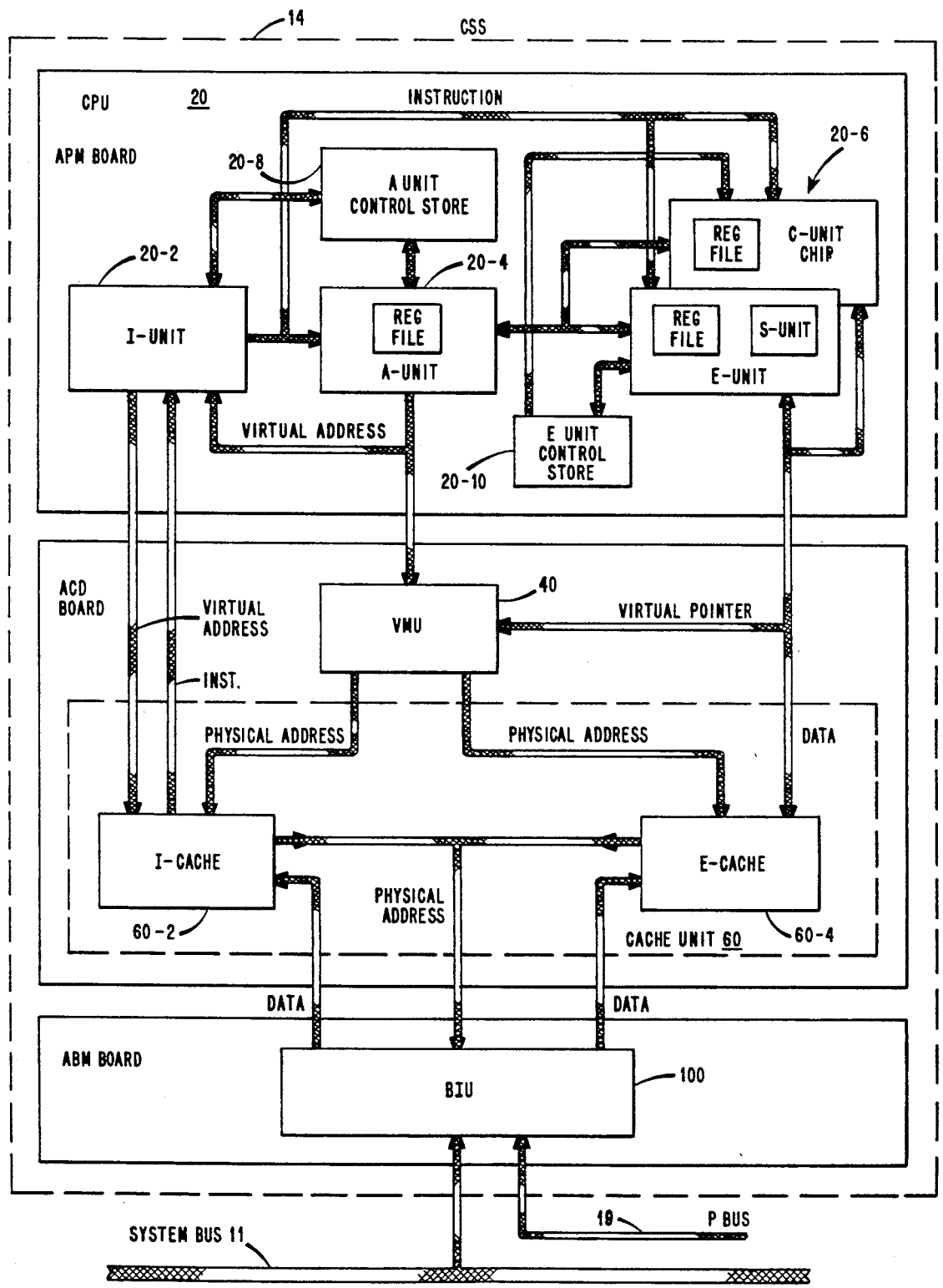
FIG. 2 illustrates in greater detail, the central system (CSS) units of FIG. 1.

FIG. 2 shows in block diagram form, the central subsystem (CSS) unit 14 which takes the form of the production data processing system of the related patent application of Ming-Tzer Miu and Thomas F. Joyce. As shown, CSS unit 14 includes a central processing unit (CPU) 20, a virtual memory unit (VMU) 40 and a cache unit 60. The cache unit 60 couples to system bus 11 through a bus interface unit (BIU). The BIU 100 has four interfaces. It serves as an interface for CPU 20, VMU and cache unit stages, system bus 11 and P bus 19.

As shown, the main elements of CPU 20 include an instruction unit (I unit) stage 20-2, an address unit (A unit) stage 20-4 and an execution unit (E unit) stage 20-6. In the preferred embodiment, the execution unit stage 20-6 include a scientific unit (S-unit) and a commercial instruction processing unit (C-unit). The cache unit stage 60 includes an instruction cache (I-cache) 60-2 for storing instructions which are to be executed and an execution cache unit (E-cache) 60-4 for storing operands or data which are to be operated on according to the instructions being executed.

The I-unit 20-2 performs two main functions. It prefetches instructions from the I-cache unit 60-2 and cracks or decodes these instructions to determine how the other units, namely the A-unit 20-4 and the E-unit 20-6 will further process those instructions. In addition, the I-unit 20-2 executes certain branch instructions which are then removed from the production line.

The A-unit 20-4 generates addresses from instructions it receives from the I-unit 20-2. Additionally, it executes certain types of instructions such as register-to register type instructions removing them from the production line. When the instruction is a type of instruction which is to be executed by E-unit 20-6, the A-unit 20-4 sends a virtual address to VMU 40 which translates it into a physical address for fetching the specified operands from the E-cache unit 60-4. The operands fetched from the E-cache unit 60-4 are then transferred to the E-unit 20-6 for completing the execution of the instruction originally received by the I-unit 20-2 from the I-cache unit 20-2. The A-unit 20-4 will also confirm the execution of a branch instruction and send the branch address back to the I-unit 20-2 which will have already requested the next instruction from the I-cache unit 60-2 specified by the I-unit 20-2 prefetch branch address.

As seen from FIG. 2, both the A-unit 20-4 and E-unit 20-6 include register files which store the contents of the registers which are programmer accessible. Also, both the I-cache unit 60-2 and E-cache unit 60-4 are updated with instructions and operands fetched from main memory via system bus 11 and BIU 100.

As shown in FIG. 2, the I-unit stage 20-2 and A-unit stage 20-4 share a common firmware control store element 20-8. Similarly, E-unit and C-unit execution units 20-6 share another common firmware control store element 20-10.

The I-unit 20-2, A-unit 20-2 and E-unit 20-6 pipelined stages together with their control elements 20-8 and 20-10 occupy a mother circuit board. The system bus and P bus interface circuits of BIU 100 occupy another mother board. VMU stage 40 and cache unit stage 60 occupy a daughter board which plugs into the BIU 100 mother board. Thus, the entire CSS unit requires two socket card positions within the system.

BUS INTERFACE UNIT CIRCUITS 100

Figure 3A:
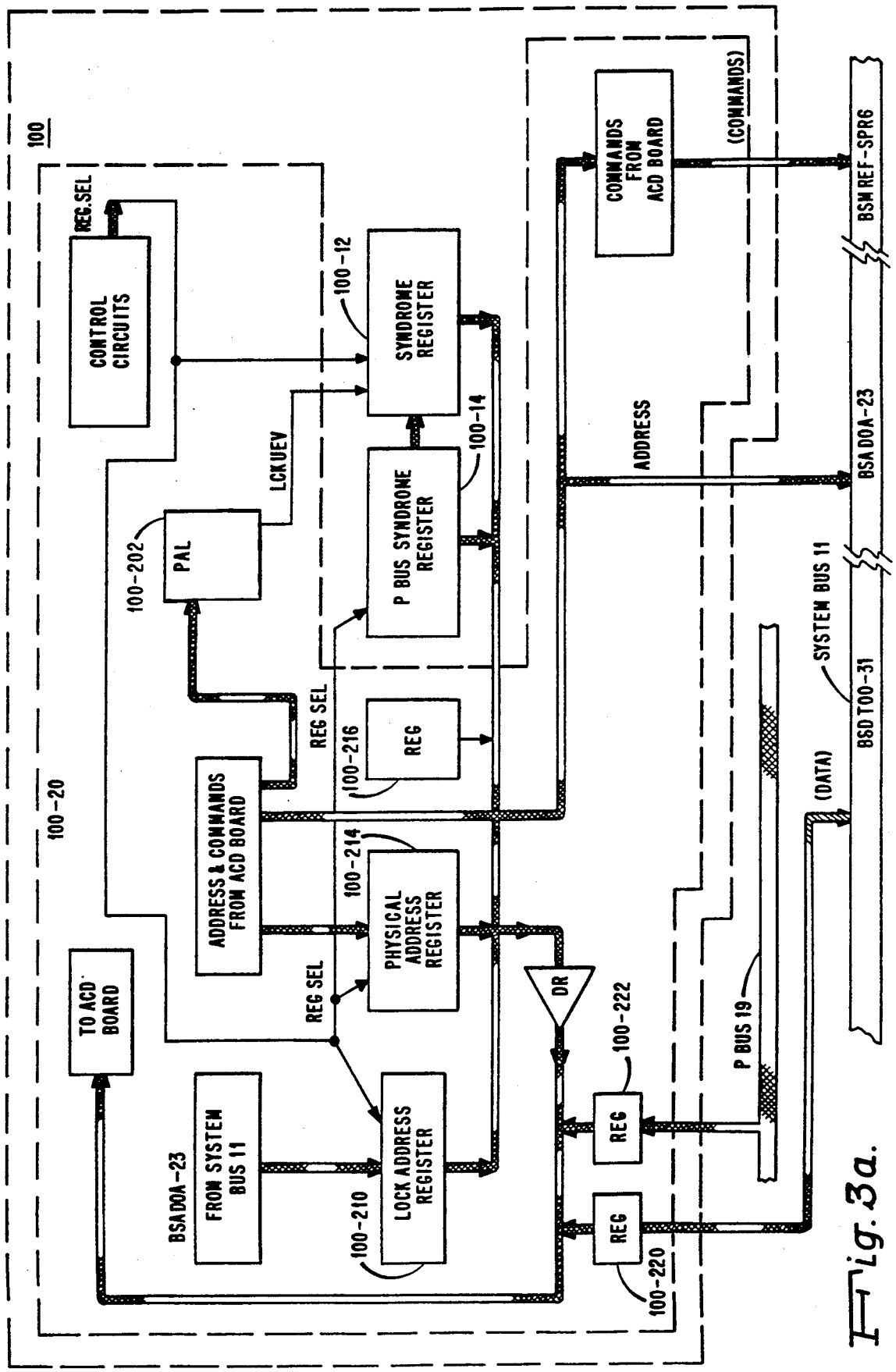
FIG. 3a illustrates in greater detail, the bus interface circuits of the central system (CSS) units of FIG. 1.

FIG. 3a shows in block diagram form, the circuits of BIU 100 in greater detail. BIU 100 includes a number of registers. These include a lock register 100-210 and a physical address register 100-214.

The lock address register 100-210 monitors the addresses being forwarded to the system bus 11 and saves the address associated with last lock operation performed by the CSS unit. The physical address register 100-214 is involved in the overall recovery process. If a failure occurs in the pipeline stages for any reason, the address contents of this register indicate to the software the last physical address or I/O channel number that was being used by the CSS unit in connection with accessing system bus 11.

As shown, BIU 100 includes a pair of syndrome registers, 100-12 and 100-14, one for storing status information pertaining to system bus 11 and the other for storing status information pertaining to P bus 19. Data register 100-220 is used for transferring data to and from cache unit 60-6 and system bus 11. Data register 100-222 is used for P bus data transfers from P bus 19.

A programmable array logic (PAL) device 100-202 is connected to monitor commands from cache unit 60-6. A PAL 100-202 is used to detect unusual event lock request sequences which result in the setting of another particular bit position of syndrome register 100-12 (i.e., bit 14). PAL 100-202 operates to generate the lock signal LOCKUEV in response to either signal LOCKER-+OA or signal LOCKER+OB. Signal LOCKER-+OA is generated by PAL 100-202 when a lock clear command is specified to be done by the E-cache stage and the memory lock history indicator flip-flop is not active or on. It is also generated when a lock set command is specified to be done by the E-cache stage and the memory lock history indicator flip-flop is already active on.

The PA 100-202 generates signal LOCKER+OB in response to auxiliary commands and checks for similar situations relative to the setting and clearing of the memory lock history indicator flip-flop. That is, it generates the LOCKUEV signal if the auxiliary command specifies a lock clear operation and the lock indicator flip-flop is already off or when the auxiliary command specifies a lock set operation and lock indicator flip-flop is already on.

Each CSS subsystem unit also includes timer circuits, not shown, for ensuring that the lock operation is completed within a reasonable amount of time. When the lock command is issued to a memory subsystem, the time it takes the memory subsystem to generate an acknowledgement signal is monitored. If the time-out period is exceeded, this causes the setting of a syndrome register bit to be used in reporting the occurrence of an unusual event.

Memory and I/O Lock Circuits

Figure 3C:
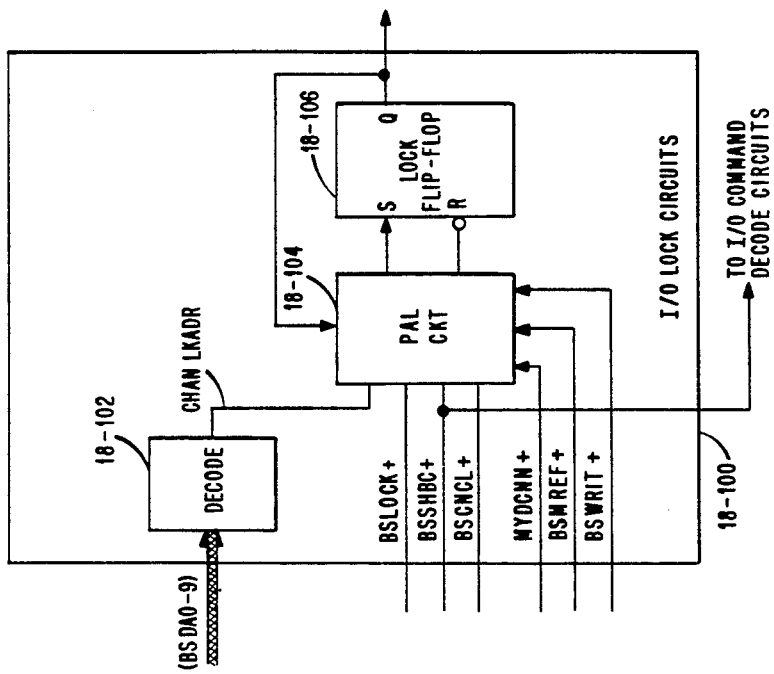
FIGS. 3b and 3c illustrate in greater detail, the lock hardware mechanism utilized in the memory and I/O subsystem of FIG. 1.
Figure 3B:
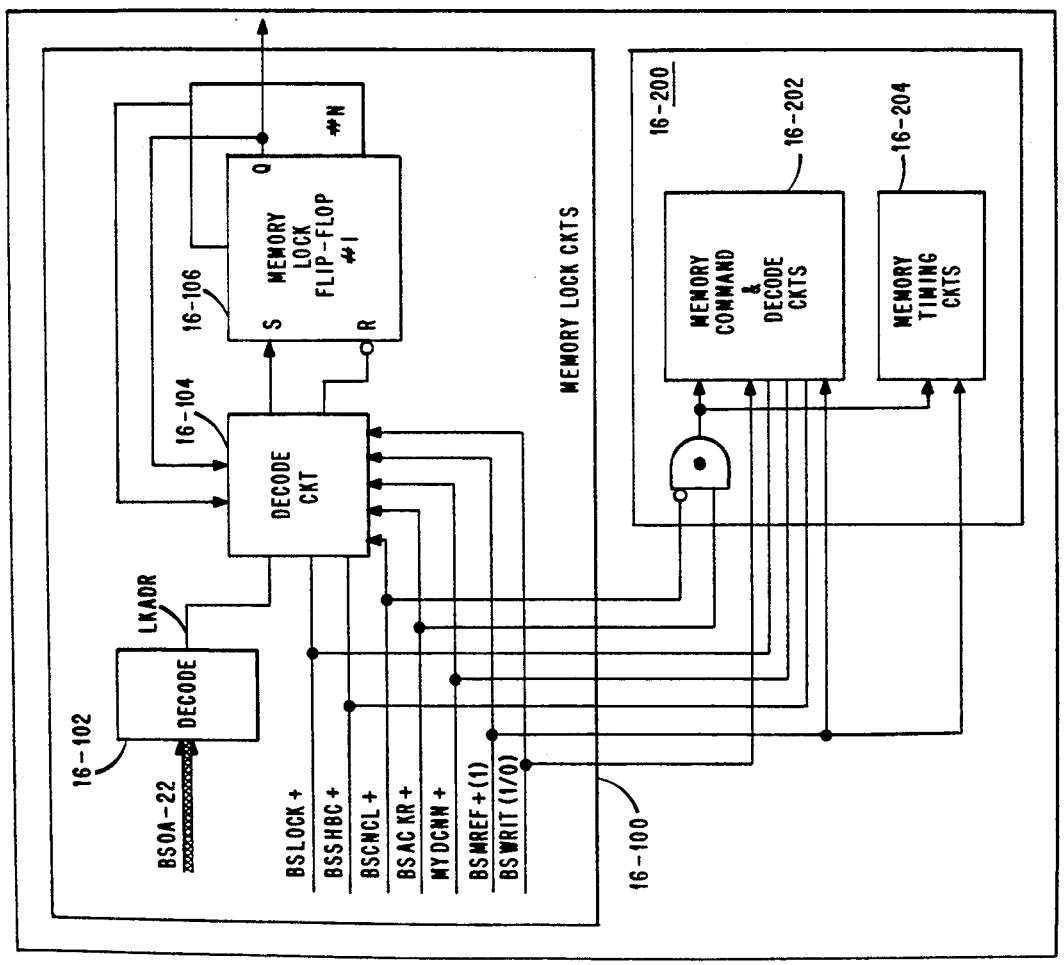

FIGS. 3b and 3c illustrate in block diagram form, the circuits which make up the memory and I/O lock circuits included in the memory subsystem and I/O subsystem units of FIG. 1. Each memory subsystem unit includes a number of lock bits. Each valid memory address has an associated lock bit which is shared with a number of other addresses. Therefore, it is most important to minimize the duration that a lock bit remains set.

As shown in FIG. 3b, the memory lock circuits include a decoder circuit 16-102 for decoding input bus addresses and generating a lock address signal LKADR which is applied to a further decoder circuit 16-104. This circuit decodes the command signals BSLOCK+ through BSWRIT+ and generates appropriate set and reset signals which are applied to the designated one of n number of memory lock bit flip-flops 16-106. The entire group of circuits of block 16-100 are implemented in a programmable array logic (PAL) device, which is conventional in design.

Additionally, FIG. 3a shows a section 16-200 of the memory subsystem unit 16 which includes the memory command and decode circuits of block 16-202 and the timing circuits of block 16-204. For the purposes of the present invention, these circuits are conventional in design and may take the form of the control and timing circuits disclosed in U.S. Pat. No. 4,410,943. As shown, the circuits of block 16-202 receives as inputs, the command signals from system bus 11 which are decoded and initiate a memory cycle of operation whose timing is defined by signals generated by the memory timing circuits of block 16-204. Additionally, memory acknowledgement signal MYACKR+ is "ANDED" with the negation of cancel command signal BSCNCL+ by an AND gate 16-206. This causes AND gate 16-206 to inhibit the circuits of blocks 16-202 and 16-204 from performing a memory cycle of operation each time a memory command is accompanied by a cancel command. That is, the memory subsystem unit remains undisturbed in the presence of a cancel command as explained herein.

FIG. 3c illustrates the I/O lock circuits of block 18-100 which are similar to the circuits of block 16-100. The differences relate to the application of channel addresses to decoder 18-102 and the use of a single lock flip-flop.

DESCRIPTION OF OPERATION

Figure 4A:
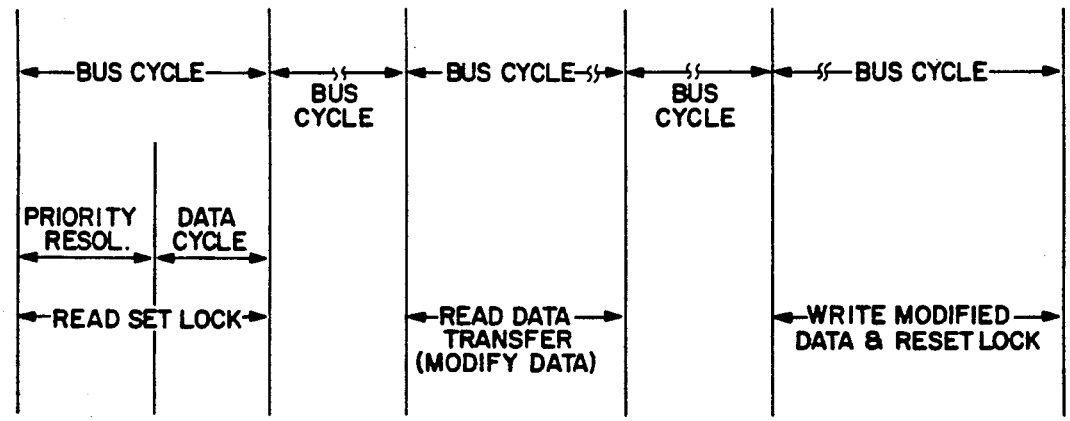
FIGS. 4a and 4b are timing diagrams used in describing the present invention.

FIG. 4a illustrates the operation of asynchronous system bus 11 which includes a distributed bus priority network for resolving the priorities of simultaneous requests asynchronously applied by any one of the subsystems of FIG. 1 on the basis of the subsystem's positioned priority. The manner in which priority is resolved is as described in the previously referenced patents, such as U.S. Pat. No. 4,559,595.

The system bus 11 operates such that when a subsystem is granted a bus cycle (i.e., wins the bus), it is guaranteed that no other subsystem can be doing that same bus cycle operation. However, once a bus cycle is started or is committed to a particular requestor, the requestor is required to perform some type of cycle and then withdraw.

This can be seen from the bus cycles illustrated in FIG. 4a. Once a requestor asynchronously generated a bus request, this establishes the beginning of a bus cycle. During each system bus cycle, there are three identifiable intervals. The first interval is the period of time required to determine the highest priority subsystem which is to be granted the bus cycle (i.e., the unit which as won the system bus). This interval corresponds to the priority network resolution cycle section of each cycle of FIG. 4a. It starts at the negative going edge of bus request signal BSREQT—. The interval ends following the amount of asynchronous delay allowed within the system for priority to settle and for selecting the highest priority unit requesting use of bus 11.

The next interval, termed the data cycle, is the period during which the bus master calls the bus slave or stated differently transfers the request to system bus 11. This interval starts at the negative going edge of bus data cycle, now signal BSDCNN—. The transition of this signal indicates that the use of system bus 11 has been granted to a master unit. During this interval, the master unit is required to transfer a request to a slave unit by applying information to the address, data and control lines of system bus 11.

The last interval, termed response cycle, is the period of time allocated for the response by the slave or receiving unit. This interval begins at the negative going edge of bus signal BSDCND—. During this interval, the slave unit determines if the address designates the slave unit and if it does, stores the address, data and command information applied to system bus 11. It then begins the process of determining the type of response be made to the request. At the end of the third interval which is also the end of the bus cycle, corresponds to the point at which bus data cycle, now signal BSDCNN— switches to a binary ONE.

It will be appreciated that once a bus cycle is initiated, the above three intervals are required to be completed. There are a number of different situations where after causing the system bus to be vied for, contented and won, a user processor determines that there is something wrong with the bus operation being requested and wants to withdraw or terminate the bus cycle. Heretofore, this was not possible. That is, the requestor was required to complete the bus cycle with a possible alternative of causing an error or, in the case of a memory lock command, issue a read lock no cycle signal on the system bus. This caused the memory to perform the read lock operation, cycle the memory, but inhibit the transfer of the data read from the specified memory module back to the requestor.

As mentioned, changing the state of the memory could result in further complications, particularly when the memory lock mechanism may not be operating properly.

The present invention utilizes a cancel command which can be generated prior to reaching the start of the data cycle interval of any bus cycle. The cancel command is then transmitted on system bus 11, along with the specific command which is being cancelled. When these commands are received and accepted by the slave, they are decoded and result in the cancellation of the command insofar as it requires the receiving unit to issue a cycle of operation.

That is, the cancel command is permitted to override the specified operation, such as in the case of a discovered questionably invalid memory address, in the case of a memory subsystem or I/O channel number, in the case of an I/O subsystem. The cancel command when decoded allows the completion of the bus cycle but prevents the initiation of the specified operation.

The cancel command of the present invention finds use in a variety of different types of operations. It becomes useful in issuing diagnostic commands identifiable via bus signal BSYELO+ which is described in the Appendix. Such diagnostic and cancel commands can be issued to a memory subsystem or I/O subsystem where it is necessary to set or reset reconfiguration state registers or other elements useful in diagnosing system faults. In this situation, each such command with cancel, upon being decoded, causes the required change of state without causing the memory or I/O subsystem to initiate any cycle of operation.

One type of memory command which makes use of the cancel command of the present invention is a memory read modify write (RMW) operation. FIG. 4a shows the sequence of bus cycles normally required when this type of operation takes place in system 10.

As seen from FIG. 4a, this involves one processing unit, such as CSS subsystem (CSS0) issuing a read test and set lock command to a specific memory location. This results in system bus 11 initiating the first bus cycle in FIG. 4a. In response to the memory read lock request, the memory subsystem initiates a read cycle of operation to fetch the requested data. Also, the memory lock circuits 16-100 operate to set the corresponding lock bit. Upon obtaining the data, the memory subsystem initiates a second half bus cycle, as shown in FIG. 4a, wherein it transfers the data requested to CSS subsystem CSS0. The CSS subsystem performs an operation on the data and then generates a write and reset lock command for writing the modified data back into the same location. As shown in FIG. 4a, this causes the further bus cycle to be initiated.

During this third bus cycle, the write lock reset command is transferred to the memory subsystem. The memory subsystem decodes the command and initiates a write cycle of operation for writing the modified data into the specified location. Also, the memory lock circuits 16-100 operate to reset the corresponding lock bit.

Figure 4B:
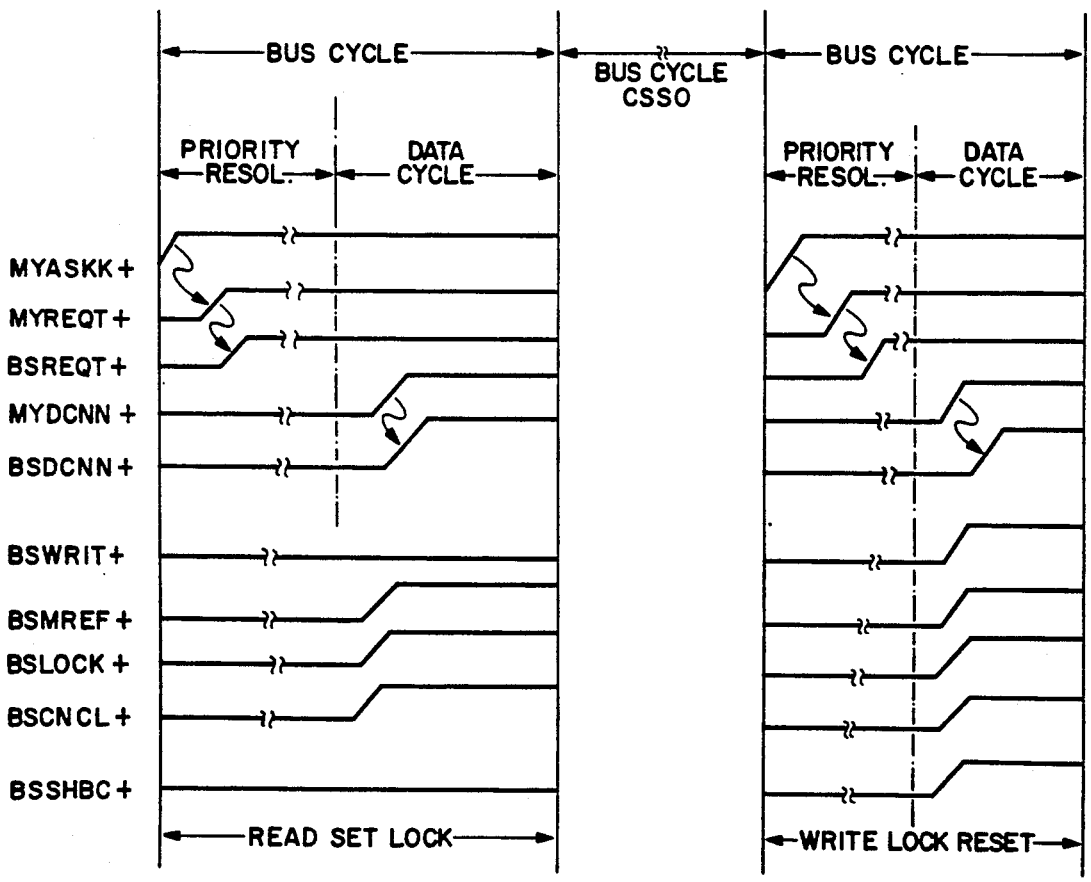

In accordance with the teachings of the present invention, the above sequence of commands can be issued by a CSS subsystem (CSS0) when it is discovered that it becomes desirable only to modify the state of the memory lock bit without disturbing the rest of the memory subsystem. The sequence of bus cycles which take place in this case are shown in FIG. 4b.

During the first bus cycle, the read set lock command, along with the cancel command, is issued prior to the start of the data cycle portion of the bus cycle. That is, the bus cancel line BSCNCL is forced to a binary ONE state.

The memory subsystem AND gate 16-206 is conditioned by the presence of the cancel command (i.e., complement of signal BSCNCL+) to inhibit the memory command and timing circuits of blocks 16-202 and 16-204 from initiating a read cycle of operation. However, the memory lock circuits 16-100, in response to the cancel command, set memory lock flip-flop 16-106 to a binary ONE state.

As the memory subsystem acknowledges acceptance of the ready lock set command during the response portion of the first bus cycle, the memory subsystem forces the qualifier bus response signal BSRESQ+ to a binary ONE. This signals to the CSS subsystem that the memory subsystem has accepted the command and that no second half bus cycle will take place.

When the CSS subsystem wants to reset the state of the memory lock bit, it generates a write lock reset command accompanied by a cancel command. This results in the initiation of the write lock reset bus cycle shown in FIG. 4b. In a similar manner, the memory subsystem AND gate 16-206 is again conditioned by the cancel command to inhibit the circuits of blocks 16-202 and 16-204 from initiating a write cycle of operation. However, the memory lock circuits 16-100, in response to the write lock reset and cancel commands, cause the resetting of lock bit flip-flop 16-106 to a binary ZERO state.

Thus, it becomes possible to borrow the memory lock circuits, in order to resolve any type of semaphore conflict or resource management conflict without disturbing any memory locations. As mentioned, this factor can be very important when the multiprocessor system is trying to recover from a fault which appears to involve the memory lock mechanism. That is, in the related copending patent application titled, "Recovery Method and Apparatus for a Pipelined Processing Unit of a Multiprocessor System," means are provided for detecting when a memory lock mechanism is misbehaving. This involves the generation of the UEV signals which result in the setting of certain syndrome status register bits. Additionally, lock register history information, as well as lock address information storage, is provided for diagnosing and identifying a misbehaving lock bit mechanism.

In order to recover from this situation, it becomes necessary to be able to reset or clear all such misbehaving or erroneously set lock bit registers. The cancel command arrangement of the present invention makes it possible to perform such clearing operations without disturbing memory subsystem status other than the specified lock bit mechanism. In this situation, the CSS subsystem generates an appropriate write lock command accompanied by a cancel command specifying the lock address contained in the lock address register. The choice of a lock reset or set command is determined by checking the state of the lock history bit. This is used to indicate how the lock mechanism misbehaved which is described in the referenced copending patent application.

Assuming that the lock should have been reset and was instead set, a write lock reset command is issued. In the same manner previously described, the memory subsystem operates to reset the lock bit flip-flop without disturbing any other part of the memory subsystem. Thus, the chance of a successful recovery is greatly increased.

Another situation which can be handled in a similar fashion is the case where a memory lock operation is detected by the time-out circuits of FIG. 1 to occur for longer than a predetermined period of time. This results in the setting of a lock operational time-out status bit within one of the syndrome registers of BIU 100. The CSS subsystem is able to recover from this condition by resetting the lock register bit(s) through the generation of a write lock reset command accompanied by a cancel command. Again, the memory contents would remain undisturbed.

From the above, it is seen how the cancel command arrangement of the present invention can be used to alter the states of certain subsystems which connect to an asynchronously operated system bus without requiring the initiation of cycles within such subsystems. It also allows a unit to override a questionable command applied to an asynchronous system bus up to the start of the time the command is transferred onto the system bus.

The present invention also is useful in situations such as those where the BIU circuits 100 detect that the CSS bus request (i.e., command) contains address, data, etc. with bad parity and sets an appropriate syndrome error bit. Instead of just allowing the request to be processed by the receiving unit which should eventually result in timeout, the present invention permits the sending of a cancel command along with the request containing the erroneous information. Normally, the error will be detected at a point in the bus cycle where it is too late to stop the request but early enough to cancel the operation.

While the above cancel operations have been described relative to a memory subsystem and lock circuits 16-100, they are just as applicable to an I/O subsystem which includes similar circuits, such as the lock circuits 18-100 of FIG. 3b. Also, it will be appreciated that other subsystems can be programmed to issue commands accompanied by cancel commands in the same manner as a CSS subsystem. For example, it becomes desirable to have SMF unit 12 issue these types of commands in connection with certain types of diagnostic operations.

APPENDIX

A. DESCRIPTION OF BUS SIGNALS

A plus (+) symbol appended to a signal name indicates that the signal is active or a binary ONE in the high voltage state. A minus (−) symbol appended to a signal name indicates that the signal is active or a binary ONE in the low voltage state.

1. PRIORITY RESOLUTION SIGNALS

This set of signals initiates Bus Cycles and make up the priority network (Pri-Net) that chooses which subsystem is to become the next bus master.

Request Signals

BSREOH+ (High Priority Bus Request)—When a binary ONE, this signal indicates that one or more subsystems in the high priority group on the system bus have requested a Bus Cycle. When a binary ZERO, there are no requests pending from the high priority group.

BSREOL+ (Low Priority Bus Request)—When a binary ONE, this signal indicates that one or more subsystems in the low priority group of the system bus have requested a Bus Cycle. When a binary ZERO, there are no requests pending from the low priority group.

Pri-Net Grant Signals

BSAUOK+ thru BSIUOK+ (Priority Network Inputs)—When a binary ONE, each of these input signals indicates that a higher positional priority subsystem (board) will not seize the next Bus Cycle, and grants this Bus Cycle to lower positional priority subsystems (boards). A bus attachment may not seize the bus when any of these inputs are binary ZEROS.

BSMYOK+ (Priority Network Output)—When a binary ONE, this output signal indicates that my subsystem unit will not use the next Bus cycle and the oldest subsystem unit (BSIUOK+) and grants it to a lower positional priority subsystem. This signal feeds the next nine board slots as BSAUOK+ thru BSIUOK+.

2. DATA CYCLE SIGNALS

These signals are transmitted from the bus master to the slave subsystem during the Data cycle.

Timing Signal

BCDCNN+ (Data Cycle Now)—When a binary ONE, this signal indicates that a bus master is making a bus transfer and has placed information on the bus for use by a slave. This is the handshaking signal from the master to all other subsystems indicating the system bus is doing a Data Cycle. All subsystems must check to see if they are the addressed slave, and if so, make the appropriate response.

Information Signals

The following signals are transferred as the information content of each Bus Cycle. these signals are each valid for use by the slave on the leading edge of signal BSDCND strobe (delayed 60 nanoseconds from signal BSDCNN).

Signals BSAD0A+ thru BSAD0H+ and BSAD00+ thru BSAD23+ contain the 32 bits of Bus Address.

Signals BSDT00+ thru BSDT15+ (Left Word of Bus Data) contain the first (left word) of two parallel data words in a bus operation.

Signals BSDT16+ thru BSDT31+ (Right Word of Bus Data) contain the second (right word) of two parallel words in a bus operation.

Command Signals

The following signals are transferred along with the Information Signals and serve to specify the type of command issued by the bus master in the current cycle. The timing of these signals is identical to the Information Signals.

BSMREF+ (Memory Reference)—When a binary ONE, this signal indicates that the address bus leads contains a memory address. When a binary ZERO, this signal indicates that the address bus leads contains an I/O channel number and a function code.

BSWRIT+ (Bus Write)—When a binary ONE, this signal indicates that data is being written from the bus master to slave in this Bus Cycle. When a binary ZERO, this signal indicates that the bus master is requesting information from the slave. When the information is available, the slave transfers it in a separate Second-Half Bus Cycle.

BSLOCK+ (Lock)—When a binary ONE, this signal indicates that the current operation is a lock operation.

BSSHBC+ (Second Half Bus Cycle)—When BSMREF+ is a binary ZERO, a binary ONE value for BSSHBC+ identifies a response to a previous read or I/O input command. When BSMREF+ is a binary ONE and BSLOCK+ is a binary ONE, BSSHBC+ commands a memory to set or reset a lock.

BSDBWD+ (Double Word)—This signal and BSDBPL+ are used during memory commands to indicate how many words of data, and in what format, are being transferred. During read response Second-Half Bus Cycles, BSDBWD+ indicates whether or not one or two words of data are on the Data Bus.

BSDBPL+ (Double Pull)—This signal is used in conjunction with BSDBWD+ during memory commands to indicate how many words of data, and in what format, are being transferred. During read response cycles, BSDBPL+ indicates whether or not more response cycles are coming.

BSBYTE+ —When a binary ONE, this signal indicates that the current transfer is a partial transfer rather than a full word (or double word) transfer BSYELO+ (Yellow)—This signal, when a binary ONE, during a memory Second-Half Bus Cycle, indicates that the accompanying transferred information (one or two words) has been corrected for a single bit error in either the right or left word, or both.

During a memory command, when BSYELO+ is a binary ONE, it signifies a diagnostic command.

BSCNCL+ (Cancel)—When this signal is a binary ONE for a memory command, it instructs the memory to inhibit the memory read or write operation while at the same time allowing lock functionality associated with the command to proceed. The response to the command, BSACKR+, BSNAKR+, or BSWAIT+, is the same whether BSCNCL+ lock is TRUE or FALSE, except that a WAIT response is not issued when BSCNCL+ is TRUE; the setting, clearing and testing of the lock flip-flop in memory is performed. The cycling of the memory is inhibited, no Second-Half Bus Cycle occurs, and the memory does not go busy. The memory responds by sending an appropriate response signal BSACKR+ accompanied by forcing signal BSRESQ+ to a binary ONE state. The requestor seeing this signal knows whether or not to expect a subsequent second half bus cycle.

Transfer Integrity Signals

The following signals accompany the Information Signals and serve as integrity or checking information relative to that information. The timing requirements of these signals are identical to the Information Signals.

BSREDL+ (Red Left)—A binary ONE value for this signal indicates that the accompanying data is BSDT00 thru BSDT15 is in error. This signal is used by memory during a read response to indicate an uncorrectable error in the leftmost word (Word 0) returned. The result in a controller is to set a status bit.

BSREDR+ (Red Right)—A binary ONE value for this signal indicates that the accompanying data in BSDT16 thru BSDT31 is in error. This signal is used by memory during a read response to indicate an uncorrectable error in the leftmost word (Word 0) returned. The result in a controller is to set a status bit. Signal BSREDR+ should not be TRUE if signal BSDBWD is a binary ZERO.

3. RESPONSE SIGNALS FROM BUS SLAVE

BSACKR+ (ACK Response)—The slave signals to the master that it is accepting this transfer by forcing this signal to a binary ONE.

BSNAKR+ (NAK Response)—The slave signals to the master that it is refusing this transfer by forcing this signal to a binary NE.

BSWAIT+ (WAIT Response)—The slave signals to the master that it is momentarily refusing the transfer by forcing this signal to a binary ONE.

BSRESO+ (Response Qualifier)—This signal is driven in conjunction with signal BSACKR+, to indicate to the master that the slave recognizes the issuance of a cancelled memory command indicated by cancel signal BSCNCL+ being a binary ONE.

B. DESCRIPTION OF LOCK COMMANDS

1. READ, TEST AND SET LOCK COMMANDS

These commands are signalled by forcing signal BSLOCK+ to an active or binary ONE state and signals BSSHBC+ to a binary ZERO state. Also, signal BSWRIT+ is forced to a binary ZERO signalling a read operation and the memory word address bits OA through 22 specifying the memory location to be locked are generated. If the lock associated with address bits OA through 22 is already set, the memory responds by forcing signal BSNAKR+ to an active or binary ONE state within three microseconds and the read operation is not performed. If the memory is momentarily busy, and cancel signal BSCNCL+ is in an inactive or binary ZERO state, the memory responds by forcing signal BSWAIT+ to a binary ONE state informing the requestor to retry.

If the lock associated with address bits OA through 22 is not already set, and either the memory is not busy or cancel signal BSCNCL+ is active or a binary ONE, the memory accepts the command, responds by forcing signal BSACKR+ to an active or binary ONE state and sets the designated memory lock bit. If cancel signal BSCNCL+ is a binary ZERO for an accepted command, the memory processes the read in a conventional manner. If cancel signal BSCNCL+ is a binary ONE for an accepted command, the memory does not return data to the requestor during a second-half bus cycle (i.e., does not force signal BSSHBC+ to a binary ONE).

2. READ AND RESET LOCK COMMANDS

These commands are signalled by forcing siqnal BSLOCK+ to a binary ONE state and signal BSSHBC+ to a binary ZERO state. Again, signal BSWRIT+ is forced to a binary ZERO state. If the memory is momentarily busy or cancel signal BSCNCL+ is a binary ONE, the memory accepts the command and responds by forcing signal BSWAIT+ to a binary ONE, informing the requestor to retry the request.

If the memory is not busy or cancel signal BSCNCL is a binary ONE, the memory accepts the command and responds by forcing signal BSACKR+ to a binary ONE and resets the designated lock. If cancel signal BSCNCL+ is a binary ZERO for an accepted command, the memory processes the read command in a normal manner. If cancel signal BSCNCL is a binary ONE for an accepted command, the memory does not cycle and does not respond to the requestor by forcing signal BSSHBC to a binary ONE.

3. WRITE, TEST AND SET LOCK COMMANDS

These commands are signalled by forcing signal BSLOCK+ to a binary ONE and signal BSSHBC+ to a binary ZERO state. Also, signal BSWRIT is forced to a binary ONE signalling a write operation and the memory word address bits OA through 22 specifying the lock memory location are generated. If the lock associated with address bits OA through 22 are already set, the memory responds by forcing signal BSNAKR to a binary ONE within three nanoseconds, and the write operation is not performed. If the memory is momentarily busy and cancel signal BSCNCL is a binary ZERO, the memory responds by forcing signal BSWAIT+ to a binary ONE informing the requestor to retry.

If the lock associated with address bits OA through 22 is not already set, and either the memory is not busy or cancel signal BSCNCL is a binary ONE, the memory accepts the command, responds by forcing signal BSACKR+ to a binary ONE and sets the designated lock bit. If cancel signal BSCNCL is a binary ZERO for an accepted command, the memory processes the write in a normal manner. If cancel signal BSCNCL is a binary ONE for an accepted command, the memory does not cycle and does not modify memory contents.

4. WRITE AND RESET LOCK COMMANDS

These commands are signalled by forcing signal BSLOCK+ to a binary ONE and signal BSSHBC+ to a binary ONE. Also, signal BSWRIT is forced to a binary ONE and the proper memory word address bits OA through 22 are generated. If the memory is busy and cancel signal BSCNCL+ is a binary ZERO, the memory responds by forcing signal BSWAIT+ to a binary ONE, informing the requestor to retry the operation.

If the memory is not busy or cancel signal BSCNCL is a binary ONE, the memory accepts the Write and Reset Lock command, responds by forcing signal BSACKR+ to a binary ONE and resets the specified lock bit. If cancel signal BSCNCL+ is a binary ZERO for an accepted command, the memory processes the write in a conventional manner. If cancel signal BSCNCL+ is a binary ONE for an accepted command, the memory does not cycle and does not modify the memory contents.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A mechanism for managing resources and for facilitating the recovery of a system from transient faults, said system including at least one unit coupled to an asynchronous system bus for transmitting requests to a receiving unit coupled to said system bus during bus cycles allocated to said transmitting unit on a priority basis, said requests including addresses, data and commands, said mechanism comprising:

command generating means included in said one unit for selectively generating a cancel command to accompany each command specifying an operation to be performed on a resource included in said receiving unit, said command generating means being coupled to said system bus and enabled to generate said cancel command during each bus cycle; and, said receiving unit including means coupled to said bus for storing said commands for decoding and control logic circuits coupled to said resource and to said system bus, said means for storing in response to said each command received from said one unit by said receiving unit to cause said receiving unit from performing any cycle of operation when said each command is accompanied by said cancel command, and said control logic circuits in response to said command and cancel command causing a specified change of state in said resource which prevents said receiving unit from not being disturbed in response to said command thereby ensuring said reliable recovery.

2. The mechanism of claim 1 wherein said resource is a locking mechanism and wherein said control logic circuits cause said locking mechanism not to be disturbed.

3. The mechanism of claim 2 wherein said each command transmitted by said one unit is coded to specify a memory lock operation and said receiving unit control logic circuits in response to said command causes the switching of said locking mechanism to a predetermined state.

4. The mechanism of claim 3 wherein said one unit further includes a plurality of registers coupled to said system bus and to said command generating means, one of said registers being conditioned in response to each memory lock command to store said address of each memory lock command for identifying which one of the lock mechanisms was to be switched to said active state, another one of said registers coupled to said command generating means for storing an indication of the state which said lock mechanism is being switched to by one of said memory lock commands, said command being coded to include said memory lock address and specify switching said one lock mechanism to a state derived from said another one of said registers and accompanied by said cancel command for causing said switching of said locking mechanism to a state for enabling said recovery.

5. The mechanism of claim 1 wherein said command generating means operates to generate said cancel command predetermined point within each bus cycle for causing said one unit to inhibit execution of said command associated therewith so as to prevent said resource from being placed in an indeterminate state.

6. The mechanism of claim 5 wherein said predetermined point corresponds the start of the data transfer portion of each bus cycle.

7. The mechanism of claim 1 wherein said requests include diagnostic commands for placing resources in predetermined states.

8. The mechanism of claim 5 wherein said requests include read and write commands wherein an error is detected in any one address, data or command portion of said command at a time which is too late to inhibit transfer of said request but prior to said predetermined point of a bus cycle.

9. A method for managing resources within a data processing system, said system including at least one central subsystem (CSS) unit and a plurality of memory and input/output units coupled in common to an asynchronous system bus for transmitting requests between a pair of units during bus cycles allocated to said units on a priority basis, said requests including addresses, data and commands, said mechanism comprising:

(a) selectively generating a cancel command by command generating means included in said CSS unit to accompany each command specifying an operation to be performed on a resource included in a designated one of said plurality of units, said cancel command being generated prior to a predetermined point within each bus cycle; and, (b) receiving said commands by said designated one of said units for decoding by control logic circuits included in said unit which couple to said resource and to said system bus; and, (c) causing a change of state by said cancel command in said resource specified by said command while preventing said designated one of said units from being disturbed in response to said command.

10. The method of claim 9 wherein said resource is a locking mechanism and wherein said control logic circuits cause said locking mechanism not to be disturbed.

11. The method of claim 10 wherein said each command transmitted by said CSS unit is coded to specify a memory read lock set operation and wherein step (c) further includes the step causing the switching of said resource to an active state by control logic circuits of said designated one of said units in response to said command.

* * * * *